(12) United States Patent
Komazaki

(10) Patent No.: US 11,954,054 B2
(45) Date of Patent: Apr. 9, 2024

(54) COMMUNICATION SYSTEM, SLAVE UNIT USED FOR COMMUNICATION SYSTEM, AND COMMUNICATION METHOD

(71) Applicant: TOSHIBA CARRIER CORPORATION, Kanagawa (JP)

(72) Inventor: Nariya Komazaki, Shizuoka (JP)

(73) Assignee: TOSHIBA CARRIER CORPORATION, Kanagawa (JP)

( * ) Notice: Subject to any disclaimer, the term of this patent is extended or adjusted under 35 U.S.C. 154(b) by 0 days.

(21) Appl. No.: 17/814,302

(22) Filed: Jul. 22, 2022

(65) Prior Publication Data

US 2024/0028536 A1 Jan. 25, 2024

Related U.S. Application Data

(63) Continuation of application No. PCT/JP2020/003357, filed on Jan. 30, 2020.

(51) Int. Cl.
*G06F 13/36* (2006.01)
*G06F 13/362* (2006.01)
*H04L 12/40* (2006.01)

(52) U.S. Cl.
CPC ........ *G06F 13/362* (2013.01); *H04L 12/4013* (2013.01)

(58) Field of Classification Search
CPC ............................ G06F 13/362; H04L 12/4013
See application file for complete search history.

(56) References Cited

U.S. PATENT DOCUMENTS

2003/0074511 A1* 4/2003 Kramer ............... H04L 5/1461
710/305
2003/0194015 A1 10/2003 Suganuma et al.
(Continued)

FOREIGN PATENT DOCUMENTS

JP 2000-165568 6/2000
JP 2003-304265 10/2003
(Continued)

OTHER PUBLICATIONS

Internation Search Report in PCT/JP2020/003357, dated Apr. 14, 2020.
Written Opinion in PCT/JP2020/003357, dated Apr. 14, 2020.

*Primary Examiner* — Henry Tsai
*Assistant Examiner* — Harry Z Wang
(74) *Attorney, Agent, or Firm* — DLA Piper LLP (US)

(57) ABSTRACT

A communication system includes a master unit; and a plurality of slave units including a slave unit to which a termination resistance is set, the plurality of slave units connected to the master unit via a communication line. In the communication system, the master unit includes a master communication control unit that normally sets a communication rate of communication performed with the plurality of slave units to a high baud rate, switches the high baud rate to a low baud rate after detecting that communication with the slave unit to which the termination resistance is set is disabled, transmits an instruction for switching the low baud rate to the high baud rate to the plurality of slave units after detecting that the communication with the slave unit to which the termination resistance is set is restored, and switches setting of the master unit itself to the high baud rate.

4 Claims, 7 Drawing Sheets

(56) References Cited

U.S. PATENT DOCUMENTS

2016/0080168 A1* 3/2016 Lieder ................. H04L 12/4013
                                                           370/468
2016/0330044 A1* 11/2016 Andrews ............... H04L 5/0055
2019/0058614 A1*  2/2019 de Haas .................. H04L 69/18
2020/0382337 A1* 12/2020 Portillo .................. H04L 12/40

FOREIGN PATENT DOCUMENTS

| | | |
|---|---|---|
| JP | 2004-221904 | 8/2004 |
| JP | 2006-325121 | 11/2006 |
| JP | 2010-247969 | 11/2010 |

* cited by examiner

COMMUNICATION SYSTEM, SLAVE UNIT USED FOR COMMUNICATION SYSTEM, AND COMMUNICATION METHOD

CROSS-REFERENCE TO RELATED APPLICATIONS

The present application is a continuation of International Application No. PCT/JP2020/003357, filed on Jan. 30, 2020.

TECHNICAL FIELD

An embodiment of the present disclosure relates to a communication system, a slave unit used for the communication system, and a communication method.

BACKGROUND ART

JP 2000-165568 A discloses communication systems in which a plurality of slave units are bus-connected to a master unit via communication lines. In the case of an air conditioning system installed in a large building, a plurality of indoor units usually serve as slave units and an outdoor unit or a central control unit serves as a master unit, for example.

In this kind of air conditioning system, the master unit sequentially acquires and collectively manages information on the operation of each connected indoor unit (for example, set temperature information, sensor information, and the like). Further, in the air conditioning system, the master unit can collectively control the operation of the plurality of indoor units.

If the communication rate is increased in this kind of communication system, the signal waveform may be disturbed due to reflection of the communication signal at the end of the communication line. If the communication line is long, the influence thereof is particularly large. To cope with the above problem, by setting a termination resistance in the communication line, reflection of signals is suppressed and disturbance of signal waveforms can be suppressed to enable communication.

SUMMARY

In this kind of communication system, it is desirable to set termination resistances to units located at both ends of the communication line. The following is conceivable: a master unit located at one end of the communication line automatically searches for a slave unit estimated to be located at the most distant position, the master unit transmits an instruction for setting a termination resistance to the slave unit, and accordingly, the slave unit automatically sets the termination resistance. The exchange of information between the master unit and the slave unit before the setting of the termination resistance is performed by means of a low-speed communication that enables communication even if the termination resistance is not present.

However, if such automatic setting of the termination resistance is performed, a relay or the like to be connected to the communication line is required in order to cause a resistance in the slave unit to function as the termination resistance. Normally, an open relay is used as the relay. Therefore, if a power source of a slave unit to which a termination resistance should be set is turned off, there will be no termination resistance for the slave unit on the communication line. Accordingly, it is assumed that there will arise a problem that high-speed communication between the master unit and all slave units will be disabled.

In a communication system, a plurality of slave units are connected to a master unit via communication lines and a termination resistance is set to a slave unit. The present disclosure has been devised in view of the above-described problems, and an object of the present disclosure is to provide a communication system, a master unit and a slave unit used for the communication system, and a communication method that enable, in the above communication system, appropriate communication between the master unit and other slave units even if communication between the master unit and the slave unit to which a termination resistance is set is disabled.

In order to achieve the above object, a communication system of the present disclosure includes: a master unit; and a plurality of slave units including a slave unit to which a termination resistance is set, the plurality of slave units being connected to the master unit via a communication line, in which the master unit includes a master communication control unit that normally sets a communication rate of communication performed with the plurality of slave units to a high baud rate, switches the high baud rate to a low baud rate after detecting that communication with the slave unit to which the termination resistance is set is disabled, transmits an instruction for switching the low baud rate to the high baud rate to the plurality of slave units after detecting that the communication with the slave unit to which the termination resistance is set is restored, and switches setting of the master unit itself to the high baud rate, and each of the plurality of slave units includes a slave communication control unit that normally sets a communication rate of communication performed with the master unit to a high baud rate, switches the high baud rate to a low baud rate after detecting that the communication with the master unit is disabled, and switches the low baud rate to the high baud rate after receiving, from the master unit, an instruction for switching the low baud rate to the high baud rate.

A master unit used for a communication system of the present disclosure normally performs communication at a high baud rate via a communication line, switches the high baud rate to a low baud rate after detecting that the communication is disabled, and is connected to a plurality of slave units via a communication line, the plurality of slave units including a slave unit to which a termination resistance is set, and the master unit includes a master communication control unit that normally sets a communication rate of communication performed with the plurality of slave units to the high baud rate, switches the high baud rate to the low baud rate after detecting that communication with the slave unit to which the termination resistance is set is disabled, transmits, to the plurality of slave units, an instruction for switching the low baud rate to the high baud rate after detecting that communication with the slave unit is restored, and switches setting of the master unit thereof to the high baud rate.

A slave unit used for a communication system of the present disclosure is connected to, through a communication line, a master unit that sets a communication rate of communication performed with a plurality of slave units including a slave unit to which a termination resistance is normally set to a high baud rate, switches the high baud rate to a low baud rate after detecting that communication with the slave unit to which the termination resistance is set is disabled, transmits an instruction for switching the low baud rate to the high baud rate to the plurality of slave units after detecting that the communication with the slave unit is restored, and switches setting of the master unit itself to the high baud rate, and the slave unit includes a slave communication control unit that normally sets a communication rate of communication preformed with the master unit to the high baud rate, switches the high baud rate to the low baud rate after detecting that the communication with the master unit is disabled, and switches the low baud rate to the high baud rate after receiving an instruction for switching the low baud rate to the high baud rate from the master unit.

A communication method of the present disclosure includes: performing communication normally at a high baud rate via a communication line by means of a master unit and a plurality of slave units including a slave unit to which a termination resistance is set, and switching the high baud rate to a low baud rate by means of the master unit after communication between the master unit and the slave unit to which the termination resistance is set is disabled; switching a communication rate to the low baud rate by means of a slave unit that is unable to communicate with the master unit due to the master unit switching the high baud rate to the low baud rate; after the communication between the master unit and the slave unit to which the termination resistance is set is restored, transmitting, by means of the master unit, an instruction for switching the low baud rate to the high baud rate to the plurality of slave units, and switching setting of the master unit itself to the high baud rate; and switching the low baud rate to the high baud rate by means of the slave units that receive the instruction for switching the low baud rate to the high baud rate from the master unit.

DESCRIPTION OF EMBODIMENTS

Hereinafter, an air conditioning system configured as an embodiment of a communication system of the present disclosure will be described with reference to the drawings.

Configuration of Air Conditioning System According to One Embodiment

A configuration of an air conditioning system according to the present embodiment will be described with reference to FIG. 1. An air conditioning system 1 is installed in a large building such as an office building or a commercial facility, for example. The air conditioning system 1 includes an outdoor unit 10 as a master unit and a plurality of indoor units 20-1, 20-2, and 20-3 as slave units which are bus-connected to the outdoor unit 10 by using a communication line 30 or refrigerant piping (not shown). The air conditioning system 1 is what is called a multi-type air conditioning system. The communication line 30 is a two-wire bus communication line. Remote controllers 7-1 to 7-3 are connected to the indoor units 20-1 to 20-3 respectively by wire. The operation modes of operation/shutdown and cooling/heating, the set temperature, and the like of the indoor units 20-1 to 20-3 are set by means of the remote controllers 7-1 to 7-3 respectively. The outdoor unit 10 is connected to a three-phase power source 2 with a breaker 3 therebetween. The indoor units 20-1 to 20-3 are connected to single-phase power sources 4-1 to 4-3 with breakers 5-1 to 5-3 therebetween, respectively. That is, each of the outdoor unit 10 and the indoor units 20-1 to 20-3 is independently connected to a power source. In general, it is assumed that the power sources of the air conditioning system 1 are not shut off after installation of the air conditioning system 1. However, in some cases, the power sources of the indoor units 20-1 to 20-3 may be individually shut off by means of the operations of the breakers 5-1 to 5-3 respectively.

Figure 1:
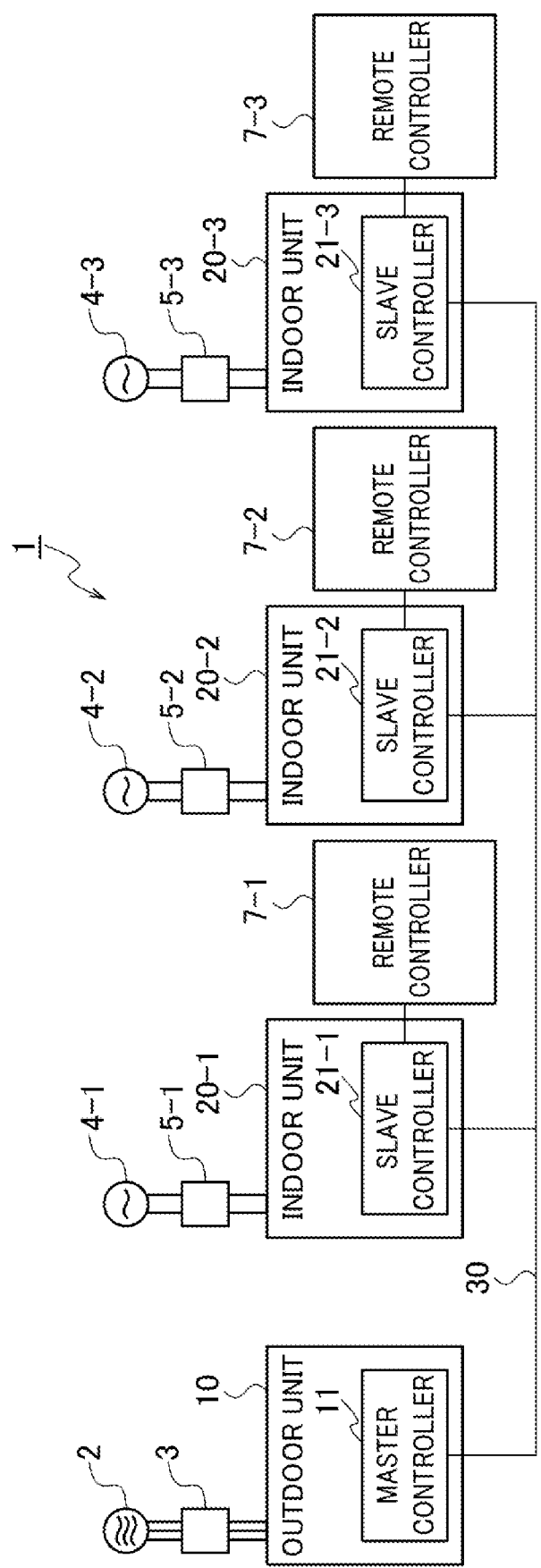
FIG. 1 is an overall view showing an air conditioning system as a communication system according to an embodiment of the present disclosure.

In FIG. 1, the number of indoor units connected to the outdoor unit 10 is three. However, the number of indoor units is not limited to three, and a large number of indoor units such as four or more indoor units may be connected to the outdoor unit. Hereinafter, if it is not necessary to specify which indoor unit among the above indoor units is used, an indoor unit is referred to as an indoor unit 20.

Figure 2:
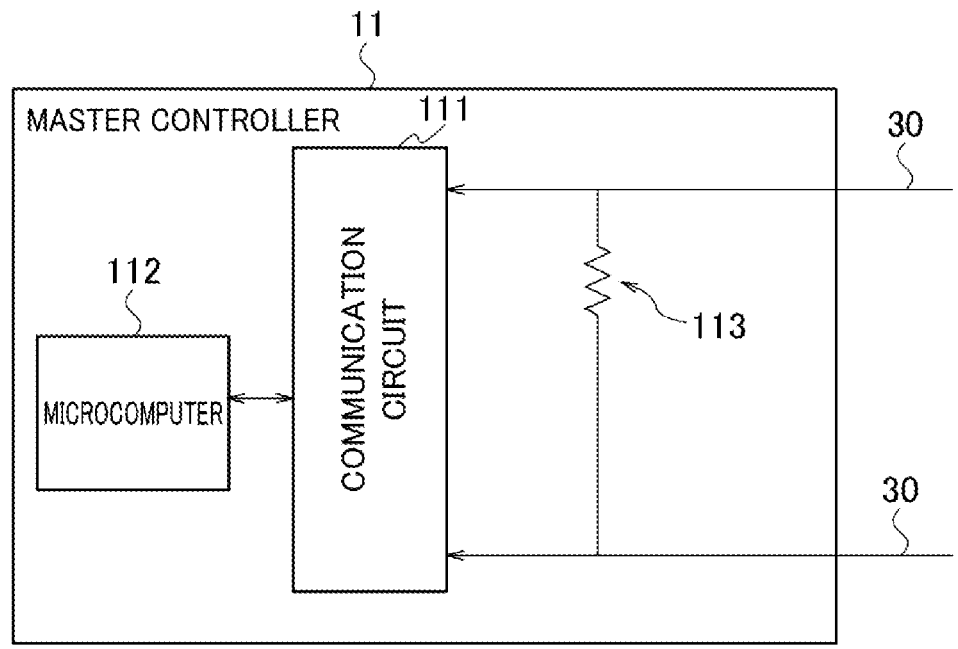
FIG. 2 is a block diagram showing a configuration of a master controller used for an air conditioning system as a communication system according to an embodiment of the present disclosure.

The outdoor unit 10 has a master controller 11 for controlling the operation of a plurality of indoor units 20. The master controller 11 includes a communication circuit 111, a microcomputer 112 serving as a master communication control unit, and a resistance 113 functioning as a termination resistance as shown in FIG. 2.

The communication circuit 111 is connected to communication lines 30. The communication circuit 111 has a function of performing communication at a high baud rate via the communication lines 30 and a function of performing communication at a low baud rate which is relatively lower in rate than the high baud rate via the communication lines 30. The high baud rate is 20 kHz and the low baud rate is 10 kHz, which is half of the high baud rate, for example. Hereinafter, communication performed at a high baud rate is referred to as high-speed communication and communication performed at a low baud rate is referred to as low-speed communication. Under the control of the microcomputer 112, the communication circuit 111 transmits, to the indoor units 20, an operation status information request and operation control information. The communication circuit 111 also acquires information on the operation status such as set temperature information and sensor information transmitted from the indoor units 20, and performs processes and stores data.

The microcomputer 112 normally sets the rate of communication performed by the communication circuit 111 with the indoor units 20 to a high baud rate. Alternatively, the microcomputer 112 switches the rate to a low baud rate after detecting that communication is disabled with the indoor units 20 to which termination resistances are set, in other words, in which resistances 212 are connected to communication lines 30, as described later. Further, after the microcomputer 112 detects that the communication performed with the indoor units 20 to which the termination resistances are set has been restored, the microcomputer 112 transmits, to each indoor unit 20, an instruction for switching the speed to a high baud rate, and switches the rate of communication performed by the communication circuit 111 with each indoor unit 20 to a high baud rate.

The resistance 113 in the master controller 11 is set up so as to function as a termination resistance while always being connected to the communication lines 30. The resistance 113 suppresses the reflection of signals transmitted through the communication lines 30 and ensures that the communication in the air conditioning system 1 is appropriately performed at a high baud rate.

Figure 3:
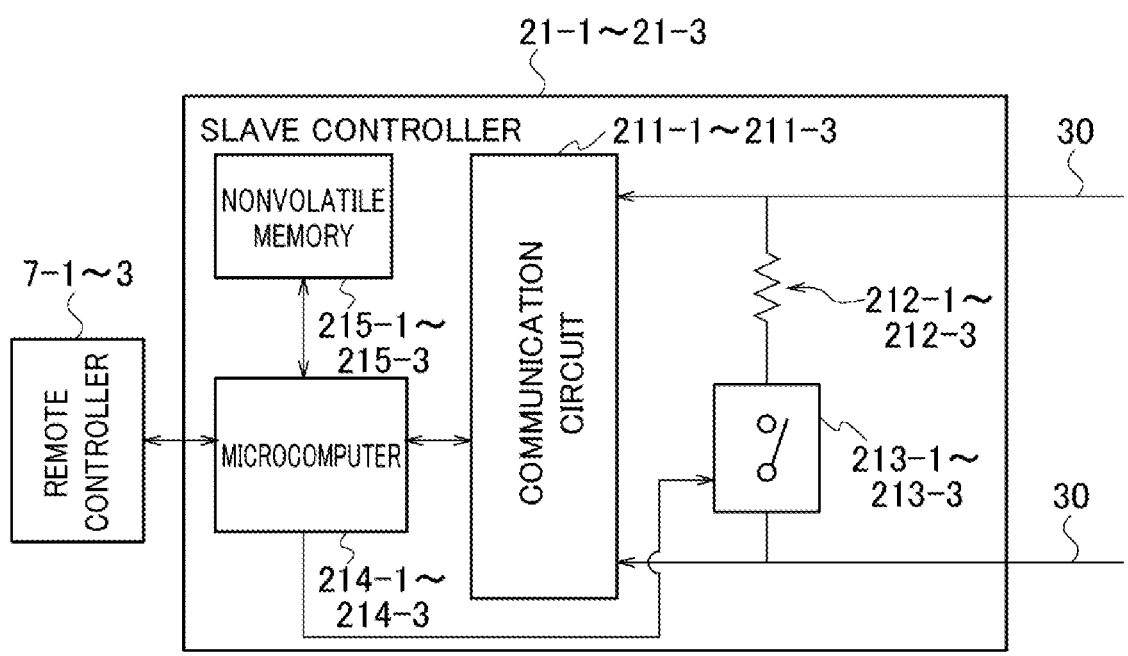
FIG. 3 is a block diagram showing a configuration of a slave controller used for an air conditioning system as a communication system according to an embodiment of the present disclosure.

The indoor unit 20 has a slave controller 21 for controlling the operation of the indoor unit 20 itself in accordance with instructions transmitted from the outdoor unit 10 and a remote controller 7. The slave controller 21 has a communication circuit 211 connected to communication lines 30, a resistance 212, a switching circuit 213, a microcomputer 214 serving as a slave communication control unit, and a nonvolatile memory 215 as shown in FIG. 3.

Similar to the communication circuit 111, the communication circuit 211 has a function of performing high-speed communication and a function of performing low-speed communication. Under the control of the microcomputer 214, the communication circuit 211 transmits information on an operation status such as the set temperature information and sensor information of the indoor unit 20 thereof to the master controller 11, namely the outdoor unit 10, in response to a request transmitted from the outdoor unit 10.

The switching circuit 213 is composed of a relay, a semiconductor switch, and the like which are operated by using an electric signal. The switching circuit 213 electrically switches the parallel connection/non-connection of the resistance 212 to the communication lines 30 by switching the conduction/non-conduction of the resistance 212 to the communication lines 30. Suppose that the resistance 212 is connected in parallel to the communication lines 30 by means of the switching circuit 213. In the above case, the resistance 212 functions as a termination resistance. The termination resistance suppresses the reflection of signals transmitted through the communication lines 30 and ensures that the communication in the air conditioning system 1 is appropriately performed at a high baud rate.

The microcomputer 214 controls the switching operation of the switching circuit 213 by supplying an electric signal to the switching circuit 213 based on information stored in the nonvolatile memory 215, which will be described later. Further, the microcomputer 214 sets the rate of communication performed by the communication circuit 211 with the outdoor unit 10 through the communication lines 30 to a high baud rate in a normal state. Alternatively, the microcomputer 214 switches the communication rate to a low baud rate after detecting that the communication with the outdoor unit 10 is disabled. After the microcomputer 214 receives an instruction for switching the speed to a high baud rate from the outdoor unit 10, the microcomputer 214 switches the rate of communication performed by the communication circuit 211 with the outdoor unit 10 to a high baud rate.

The nonvolatile memory 215 stores termination resistance setting information if the indoor unit 20 thereof is a target to which the termination resistance is to be set. The master controller 11 of the outdoor unit 10 automatically identifies an indoor unit 20 located as far away as possible by means of communication at the time of construction of the facility. The master controller 11 transmits a command for setting the termination resistance to the identified indoor unit 20. Accordingly, the microcomputer 214 of the indoor unit 20 that has received the command operates the switching circuit 213 by itself and may store the setting information in the nonvolatile memory 215 when the resistance 212 is input to the communication lines 30. Further, the following is also possible: an installation worker selects an indoor unit 20 located at a distance based on the wiring state of the communication lines 30 at the time of installation of each unit, and implements setting of the selected indoor unit 20 by using the remote controller 7, and the termination resistance setting information may thereby be directly input to the indoor unit 20. In this case, the termination resistance setting information is not stored in an indoor unit 20 for which setting is not implemented by using the remote controller 7, and this kind of indoor unit is an indoor unit 20 to which the termination resistance is not set.

Operation of Air Conditioning System According to One Embodiment

The operation of the air conditioning system 1 according to the present embodiment will be described with reference to FIGS. 4 to 8. In the sequence diagrams of FIGS. 4 to 6, thick arrows indicate high-speed communication and thin arrows indicate low-speed communication.

In the air conditioning system 1, the rate of communication performed between the outdoor unit 10 and each indoor unit 20 is normally set to a high baud rate, and communication at a high baud rate is performed between these units. When communication is performed at a high baud rate, the influence of the reflection of communication signals at the ends of each communication line 30 increases, and the signal waveforms may be disturbed. In order to cope with the above problems, by setting termination resistances to the units at both ends of each communication line 30, in other words, the outdoor unit 10 and an indoor unit 20 far from the outdoor unit 10, the reflection of the signals is suppressed and the disturbance of the signal waveforms can be prevented. An indoor unit 20 to which the termination resistance is set (in which the resistance 212 is connected to the communication lines 30) is preferably located at a position farthest from the outdoor unit 10. However, even if the indoor unit 20 is not located at a position farthest from the outdoor unit, if the indoor unit 20 is located relatively far from the outdoor unit among the connected indoor units 20, the reflection of the signals can be suppressed to some extent and the disturbance of the signal waveforms can be prevented. This enables the communication to be performed at a high baud rate. Here, the meaning of the term "far" between the outdoor unit 10 and each indoor unit 20 does not refer to the distance between the installation positions of the outdoor unit and the indoor unit, but the term "far" is used based on the length of each communication line 30 connecting both units.

The nonvolatile memory 215 of the indoor unit 20 that is a target to which a termination resistance is to be set stores termination resistance setting information indicating that the indoor unit 20 itself is a target to which a termination resistance is to be set. In the present embodiment, a nonvolatile memory 215-3 of an indoor unit 20-3 which is located at a position farthest from the outdoor unit 10 stores termination resistance setting information indicating that the indoor unit 20-3 is a target to which a termination resistance is to be set.

Figure 8:
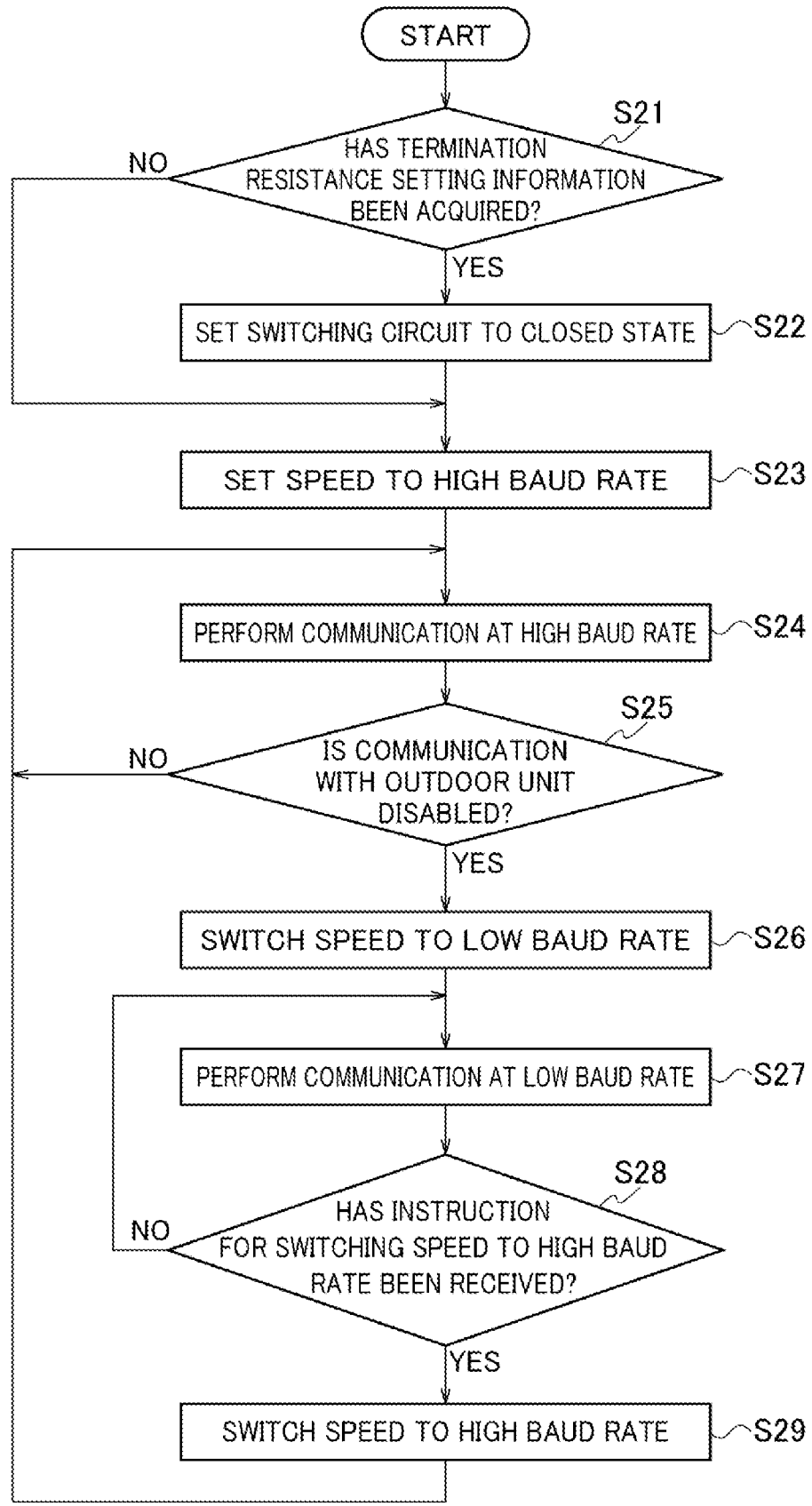
FIG. 8 is a flowchart showing operations of a slave controller of each indoor unit used for an air conditioning system as a communication system according to an embodiment of the present disclosure.

After the air conditioning system 1 is started, that is, after the power sources of units in the air conditioning system 1 are turned on, the microcomputer 214 acquires information in the nonvolatile memory 215 in each indoor unit 20 as shown in the control flow of FIG. 8. If the termination resistance setting information is acquired ("YES" in S21), the microcomputer 214 switches the switching circuit 213 to the closed state (S22).

Figure 4:
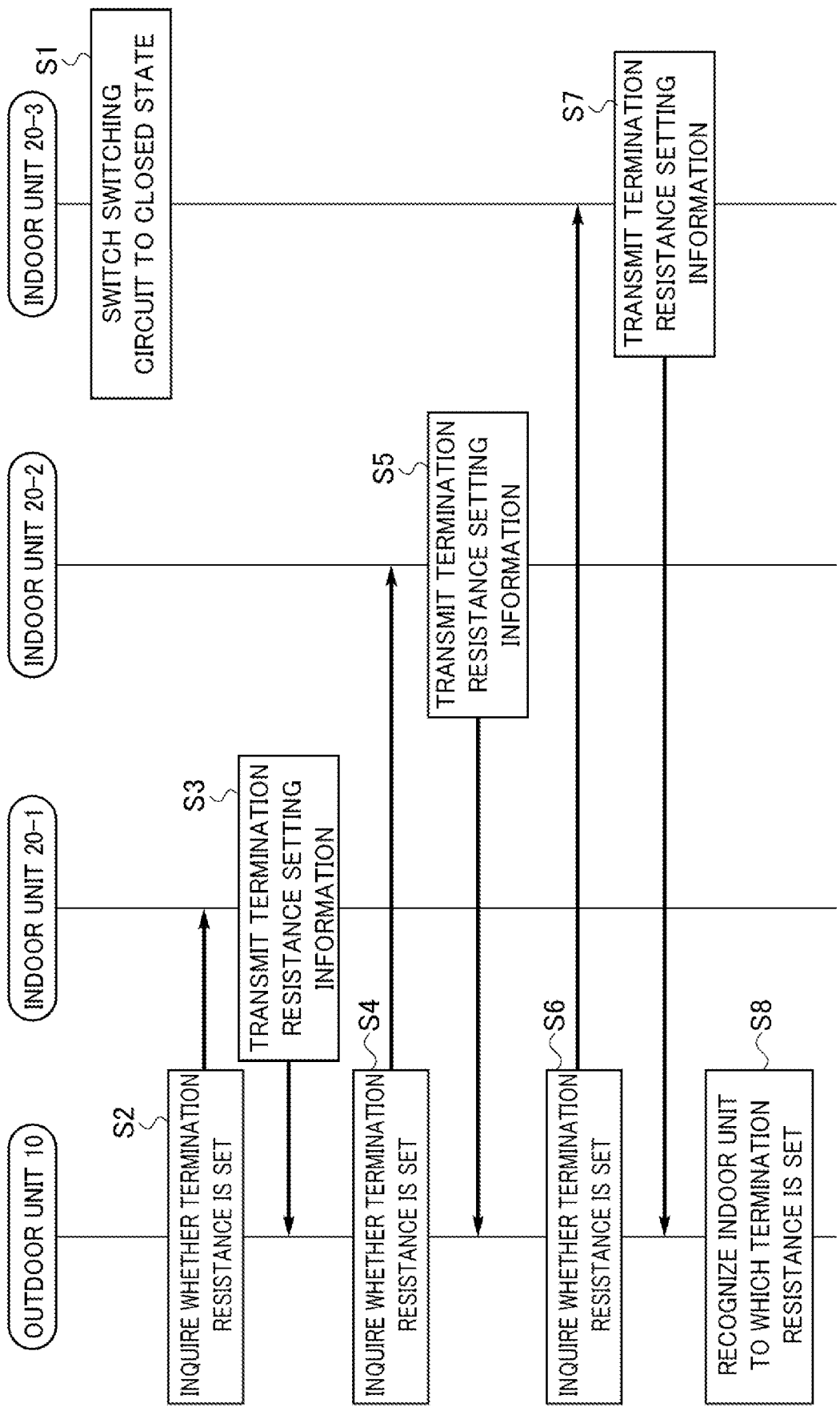
FIG. 4 is a sequence diagram showing operations performed when an air conditioning system as a communication system according to an embodiment of the present disclosure is started.
Figure 5:
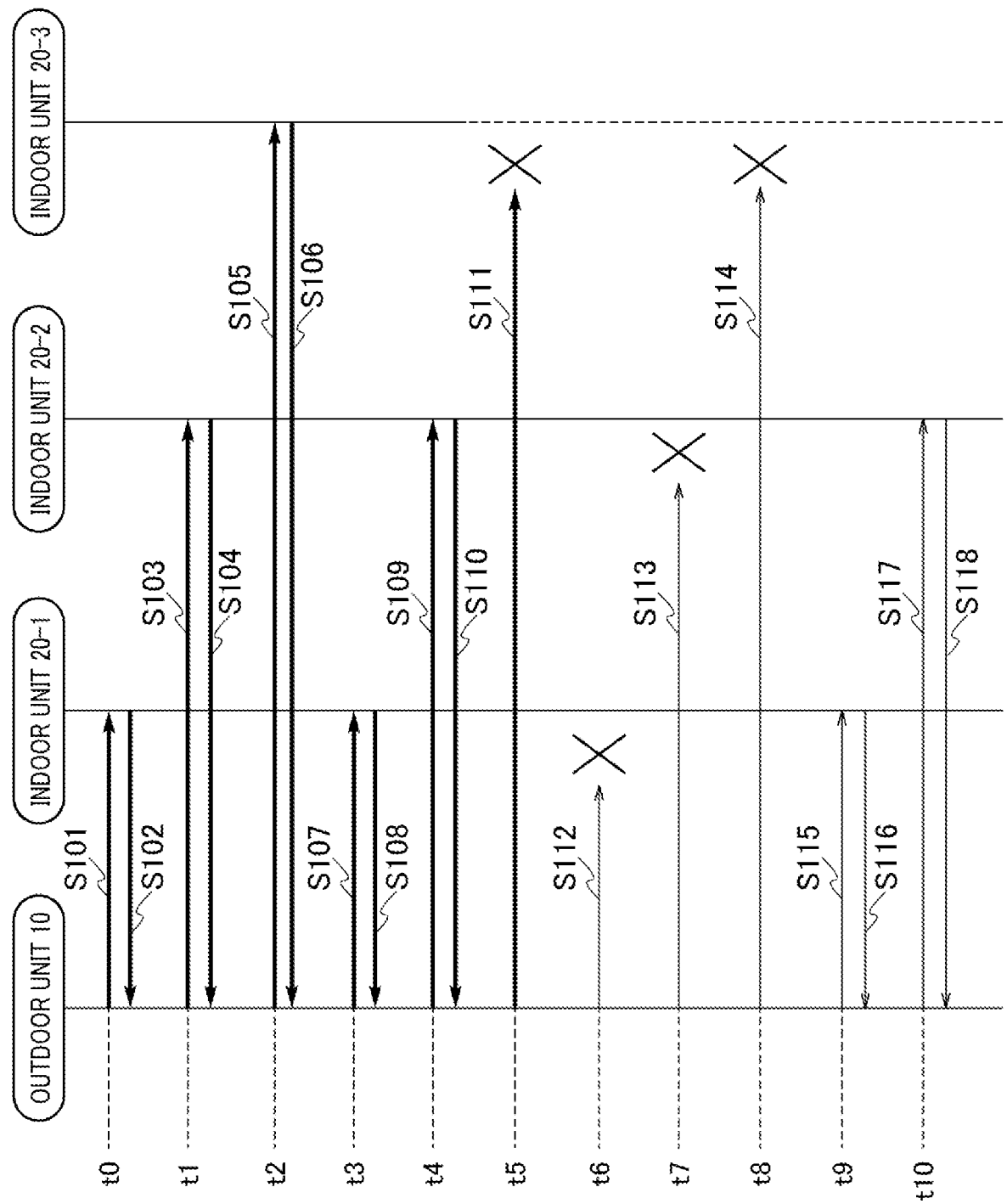
FIG. 5 is a sequence diagram showing operations when communication between an outdoor unit and an indoor unit to which a termination resistance is set is disabled in an air conditioning system as a communication system according to an embodiment of the present disclosure.
Figure 6:
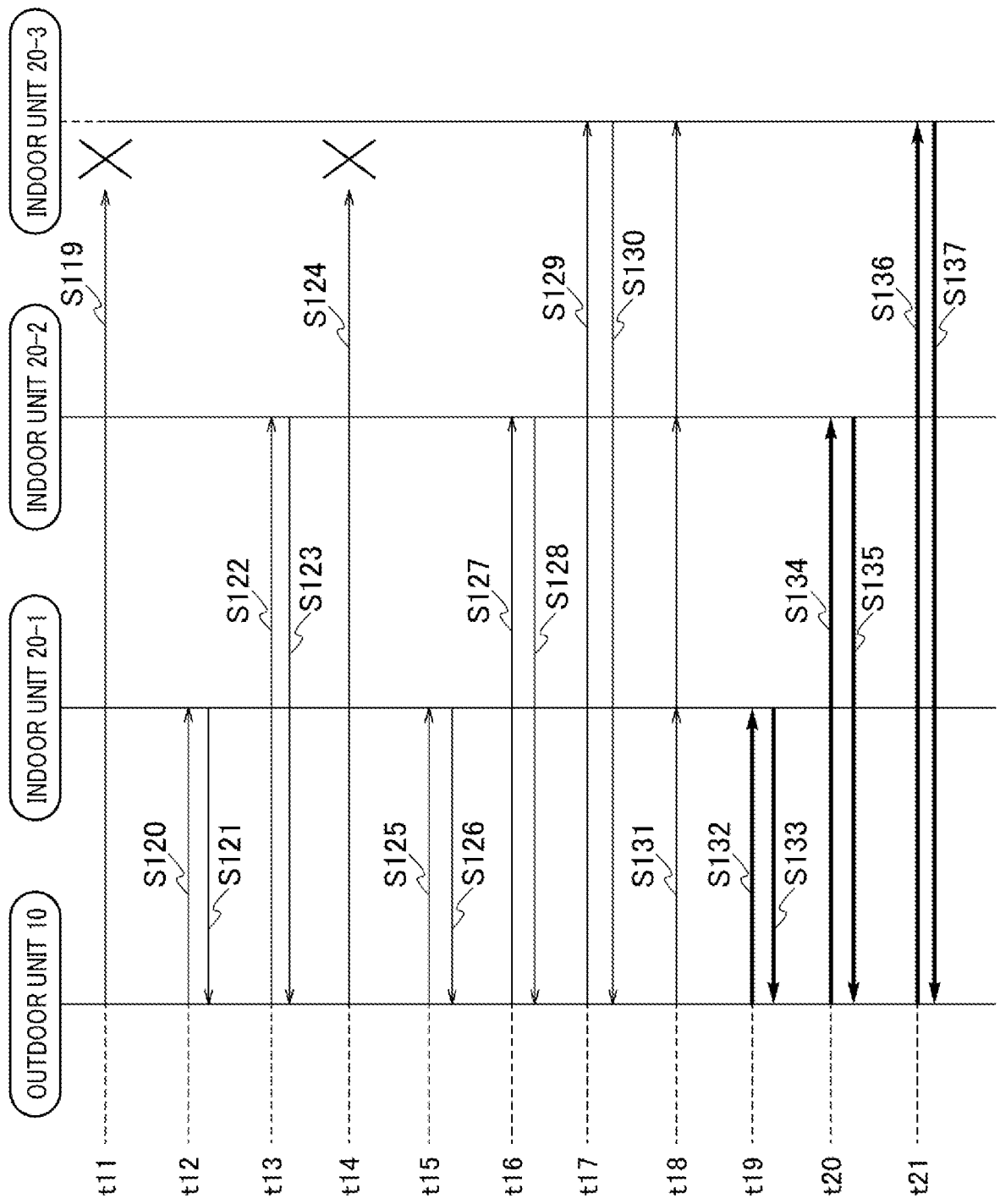
FIG. 6 is a sequence diagram showing operations when communication between an outdoor unit and an indoor unit to which a termination resistance is set is restored in an air conditioning system as a communication system according to an embodiment of the present disclosure.

Here, a microcomputer 214-3 of the indoor unit 20-3 acquires the termination resistance setting information from the nonvolatile memory 215-3, switches a switching circuit 213-3 to the closed state, and a resistance 212-3 is connected to the communication lines 30 (S1 in FIG. 4). That is, the termination resistance is set to the indoor unit 20-3. Further, in the indoor units 20-1 and 20-2, the nonvolatile memories 215-1 and 215-2 do not store the termination resistance setting information. Therefore, the switching circuits 213-1 and 213-2 are maintained in an open state, and the resistances 212-1 and 212-2 are maintained in a non-connected state. That is, no termination resistance is set to the indoor units 20-1 and 20-2.

Next, the microcomputer 112 of the outdoor unit 10 transmits, to each indoor unit 20, information for inquiring whether a termination resistance is set (S2, S4, and S6). When the air conditioning system 1 is started, the rate of communication performed between the outdoor unit 10 and each indoor unit 20 is set to a high baud rate, and the communication between these units is performed at a high speed.

After receiving an inquiry transmitted from the outdoor unit 10, each indoor unit 20 transmits information indicating the setting state of the termination resistance to the outdoor unit 10 as a response to the inquiry (S3, S5, and S7). The outdoor unit 10 recognizes the indoor unit 20 to which the termination resistance is set based on the information transmitted from each indoor unit 20 (S8). Here, the outdoor unit 10 recognizes that the termination resistance is set to the indoor unit 20-3.

After these processes are performed when a power source of each unit of the air conditioning system 1 is turned on, air conditioning communication is sequentially performed at predetermined time intervals (times t0, t1, t2 . . . in FIG. 5) between the outdoor unit 10 and each indoor unit 20. In the air conditioning communication, an operation status information request and an operation command are transmitted from the outdoor unit 10 to each indoor unit 20, for example. In response to the request and command, each indoor unit 20 transmits, to the outdoor unit 10, operation/shutdown information, set temperature information, detection data information of various sensors, and the like. At this time, the rate of communication performed between the outdoor unit and each indoor unit 20 is set to a high baud rate (S11 in FIG. 7 and S23 in FIG. 8). Therefore, the exchange of requests, commands, and information is performed by means of high-speed communication (thick arrows of S101 to S110 in FIG. 5, S12 in FIG. 7, and S24 in FIG. 8).

Suppose that, immediately after time t4, a failure state occurs in which the indoor unit 20-3 is in a power-off state or the microcomputer 112 stops operating. In the above case, the switching circuit 213-3 of the indoor unit 20-3, which has been electrically operated, is automatically set to the open state, and the resistance 212-3 functioning as the termination resistance is disconnected from the communication lines 30. This disables the high-speed communication performed between the outdoor unit 10 and each indoor unit 20. Therefore, the indoor unit 20-3 is not able to receive the information that has been transmitted from the outdoor unit 10 to the indoor unit 20-3 at time t5 (S111 in FIG. 5). At this time, the microcomputer 112 of the outdoor unit 10 recognizes that communication with the indoor unit 20-3 to which the termination resistance is set is disabled ("YES" in S13 of FIG. 7). After the microcomputer 112 recognizes that communication with the indoor unit 20-3 is disabled, the microcomputer 112 switches the communication rate of the communication circuit 111 to a low baud rate (S14 in FIG. 7).

Then, at time t6, the outdoor unit 10 transmits information to an indoor unit 20-1 by means of low-speed communication. However, since the rate of the indoor unit 20-1 is set to a high baud rate, the baud rate setting does not match. Therefore, the indoor unit 20-1 is not able to receive the transmitted information (S112 in FIG. 5).

The indoor unit 20-1 does not receive information from the outdoor unit 10 when a predetermined time elapses from the time t3 at which the information from the outdoor unit 10 was last received, more specifically, when a period of time set between time t3 and time t9 elapses from time t3, time t9 being the reception timing two cycles after time t3. Therefore, the microcomputer 214-1 recognizes that communication with the outdoor unit 10 is disabled ("YES" in S25 of FIG. 8). After the microcomputer 214-1 recognizes that communication with the outdoor unit 10 is disabled, the microcomputer 214-1 switches the communication rate of the communication circuit 211-1 to a low baud rate (S26 in FIG. 8).

Similarly, before time t10, the microcomputer 214-2 of the indoor unit 20-2 recognizes that communication with the outdoor unit 10 has been disabled, and the communication rate of the communication circuit 211-2 is switched to a low baud rate.

This enables communication to be performed between the outdoor unit 10 and the indoor units 20-1 and 20-2 because the baud rate setting between the outdoor unit 10 and the indoor units 20-1 and 20-2 can be matched at a low baud rate. Thereafter, the exchange of pieces of information on air conditioning is sequentially performed at predetermined time intervals (times t9, t10, . . . ) by means of low-speed communication (thin arrows of S115 to S123 in FIGS. 5 and 6, S15 in FIG. 7, and S27 in FIG. 8). Since low-speed communication is performed at a low baud rate, communication between each unit is possible regardless of whether a termination resistance is connected. At time t11, the outdoor unit 10 performs low-speed communication with the indoor unit 20-3. However, the indoor unit 20-3 is not able to receive information because the indoor unit 20-3 is still in the power-off state (S119 in FIG. 6).

Suppose that the power source of the indoor unit 20-3 is restored or the state is recovered from the failure state immediately after time t11. In the above case, the indoor unit 20-3 is started while the communication rate is set to a high baud rate. At the same time, the indoor unit 20-3 acquires the termination resistance setting information from the nonvolatile memory 215-3 by using the microcomputer 214-3. Further, the indoor unit 20-3 switches the switching circuit 213-3 to the closed state, connects the resistance 212-3 to the communication lines 30, and sets the resistance as a termination resistance ("YES" in S21 and S22 of FIG. 8).

Then, at time t14, the outdoor unit 10 transmits information to the indoor unit 20-3 by means of low-speed communication. However, the baud rate setting does not match because the baud rate of the indoor unit 20-3 is set to a high baud rate. Therefore, the indoor unit 20-3 is not able to receive the transmitted information (step S124 in FIG. 6).

When a predetermined time elapses from when the indoor unit 20-3 is started (from the start of the indoor unit to time t17), the indoor unit 20-3 does not receive information from the outdoor unit 10. Therefore, the microcomputer 214-3 recognizes that communication with the outdoor unit 10 is disabled ("YES" in S25 of FIG. 8). After the microcomputer 214-3 recognizes that communication with the outdoor unit 10 is disabled, the microcomputer 214-3 switches the communication rate of the communication circuit 211-3 to a low baud rate (S26 in FIG. 8).

As a result, the baud rate setting matches at a low baud rate between the outdoor unit 10 and the indoor unit 20-3, and communication between the outdoor unit 10 and the indoor unit 20-3 becomes possible. The indoor unit 20-3 receives information transmitted from the outdoor unit 10 to the indoor unit 20-3 at a low speed at time t17 (S129 in FIG. 6), and transmits the response to the information to the outdoor unit 10 (S130 in FIG. 6).

Figure 7:
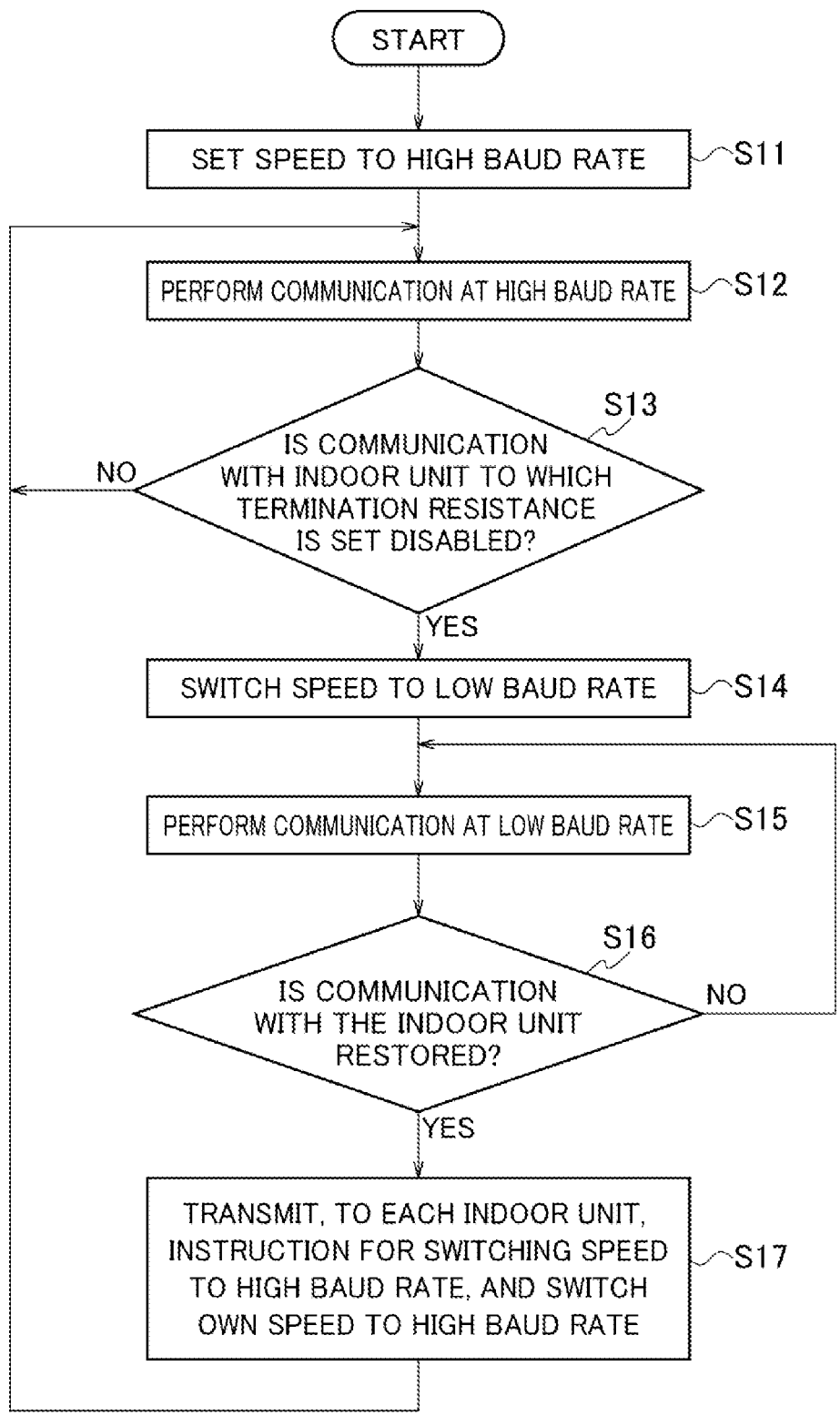
FIG. 7 is a flowchart showing operations of a master controller of an outdoor unit used for an air conditioning system as a communication system according to an embodiment of the present disclosure.

After receiving the response from the indoor unit 20-3, the outdoor unit 10 recognizes that communication with the indoor unit 20-3 is restored ("YES" in S16 of FIG. 7). At time t18, the microcomputer 112 of the outdoor unit 10 broadcast-transmits an instruction for switching the speed to a high baud rate to each indoor unit 20 at a low speed (S131 in FIG. 6). Subsequently, the microcomputer 112 switches the communication rate of the communication circuit 111 to a high baud rate (S17 in FIG. 7).

After the indoor units 20-1 to 20-3 receive an instruction for switching the speed to a high baud rate from the outdoor unit 10 ("YES" in S28 of FIG. 8), the indoor units use the microcomputers 214-1 to 214-3 to switch the communication rates of the communication circuits 211-1 to 211-3 to a high baud rate (S29 in FIG. 8).

As a result, the baud rate setting matches at a high baud rate between the outdoor unit 10 and the indoor units 20-1 to 20-3. Thereafter, the exchange of information on air conditioning is sequentially performed at predetermined time intervals (time t19, t20, . . . ) by means of high-speed communication (S12 of FIGS. 7 and S24 of FIG. 8).

According to the above-described embodiment, an air conditioning system includes an outdoor unit and a plurality of indoor units connected by means of a bus-type communication line and in which a termination resistance is set to a communication line of an indoor unit. In the air conditioning system, normally high-speed communication is performed, and when communication between the outdoor unit and the indoor units becomes disabled, the high-speed communication is switched to low-speed communication so that communication can be continued. Accordingly, it is possible to prevent interruption of communication in the air conditioning system as much as possible while performing communication efficiently. If communication with the indoor units becomes possible, communication efficiency is enhanced by quickly returning the low-speed communication to the high-speed communication.

In the present embodiment, a description has been given using an example where an outdoor unit is a master unit and a termination resistance which is supposed to be provided at one end of a communication line is preset to the outdoor unit. However suppose that a centralized management device or the like is located farther away than the outdoor unit on the communication line. In the above case, a termination resistance may be set to the centralized management device without setting a termination resistance to the outdoor unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a master unit; and
a plurality of slave units including a slave unit to which a termination resistance is set, the plurality of slave units being connected to the master unit via a communication line, wherein
the master unit includes a master communication control unit that normally sets a communication rate of communication performed with the plurality of slave units to a high baud rate, switches the high baud rate to a low baud rate after detecting that communication with the slave unit to which the termination resistance is set is disabled, transmits an instruction for switching the low baud rate to the high baud rate to the plurality of slave units after detecting that the communication with the slave unit to which the termination resistance is set is restored, and switches setting of the master unit itself to the high baud rate,
each of the plurality of slave units includes a slave communication control unit that normally sets a communication rate of communication performed with the master unit to a high baud rate, switches the high baud rate to a low baud rate after detecting that the communication with the master unit is disabled, and switches the low baud rate to the high baud rate after receiving, from the master unit, an instruction for switching the low baud rate to the high baud rate,
each of the slave units includes a resistance that can be connected to the communication line as the termination resistance, a memory that stores termination resistance setting information indicating whether each of the slave units is a target to which the termination resistance is to be set, and a switching circuit that electrically switches between connection and non-connection of the termination resistance to the communication line, and
the slave communication control unit switches between connection and non-connection of the resistance to the communication line by the switching circuit based on the termination resistance setting information stored in the memory.

2. The communication system according to claim 1, wherein
the communication system is used for an air conditioning system that includes the master unit constituted of an outdoor unit of an air conditioner and the plurality of slave units constituted of indoor units connected to the outdoor unit.

3. A slave unit used for a communication system, comprising:
- a resistance;
- a memory that stores termination resistance setting information indicating whether the slave unit itself is a target to which a termination resistance is to be set; and
- a switching circuit that electrically switches between connection and non-connection of the resistance to the communication line, wherein
- the slave unit is connected to, through a communication line, a master unit that sets a communication rate of communication performed with a plurality of slave units including a slave unit to which a termination resistance is normally set to a high baud rate, switches the high baud rate to a low baud rate after detecting that communication with the slave unit to which the termination resistance is set is disabled, transmits an instruction for switching the low baud rate to the high baud rate to the plurality of slave units after detecting that the communication with the slave unit is restored, and switches setting of the master unit itself to the high baud rate,
- the slave unit includes a slave communication control unit that normally sets a communication rate of communication preformed with the master unit to the high baud rate, switches the high baud rate to the low baud rate after detecting that the communication with the master unit is disabled, and switches the low baud rate to the high baud rate after receiving an instruction for switching the low baud rate to the high baud rate from the master unit, and
- the slave communication control unit switches between connection and non-connection of the resistance to the communication line by the switching circuit based on the termination resistance setting information stored in the memory.

4. A communication method comprising:
- performing communication normally at a high baud rate via a communication line by a master unit and a plurality of slave units including a slave unit to which a termination resistance is set, and switching the high baud rate to a low baud rate by the master unit after communication between the master unit and the slave unit to which the termination resistance is set is disabled;
- switching a communication rate to the low baud rate by a slave unit that is unable to communicate with the master unit due to the master unit switching the high baud rate to the low baud rate;
- after the communication between the master unit and the slave unit to which the termination resistance is set is restored, transmitting, by the master unit, an instruction for switching the low baud rate to the high baud rate to the plurality of slave units, and switching setting of the master unit itself to the high baud rate;
- switching the low baud rate to the high baud rate by the slave units that receive the instruction for switching the low baud rate to the high baud rate from the master unit; and
- in each of the slave units including a resistance that can be connected to the communication line as the termination resistance, a memory that stores termination resistance setting information indicating whether each of the slave units is a target to which the termination resistance is to be set, and a switching circuit that electrically switches between connection and non-connection of the termination resistance to the communication line, switching between connection and non-connection of the resistance to the communication line by the switching circuit based on the termination resistance setting information stored in the memory.

* * * * *